2 Sheets—Sheet 1.

E. H. OSBORN.

GRAIN-SEPARATORS.

No. 7,441. Reissued Dec. 19, 1876.

WITNESSES

Eugene W. Johnson
Wasta. C. Masi

INVENTOR

Egbert H. Osborn.
Clipman & Foster & Co,

ATTORNEYS

THE GRAPHIC CO. N.Y.

2 Sheets—Sheet 2

E. H OSBORN.

GRAIN-SEPARATORS.

No. 7,441.

Reissued Dec. 19, 1876.

WITNESSES

Eugene W. Johnson

Walter C. Mass

INVENTOR

Egbert H. Osborn

Chipman Fosum & Co

ATTORNEYS

THE GRAPHIC CO. N.Y.

UNITED STATES PATENT OFFICE.

EGBERT H. OSBORN, OF QUINCY, ILLINOIS.

IMPROVEMENT IN GRAIN-SEPARATORS.

Specification forming part of Letters Patent No. 149,785, dated April 14, 1874; reissue No. 7,441, dated December 19, 1876; application filed August 7, 1875.

*To all whom it may concern:*

Be it known that I, EGBERT HALSEY OSBORN, of Quincy, in the county of Adams and State of Illinois, have invented certain new and useful Improvements in Grain Cleaners and Separators; and I do hereby declare that the following is a full, clear, and exact description of the same, reference being had to the annexed drawing, making part of this specification, in which—

Figure 1:
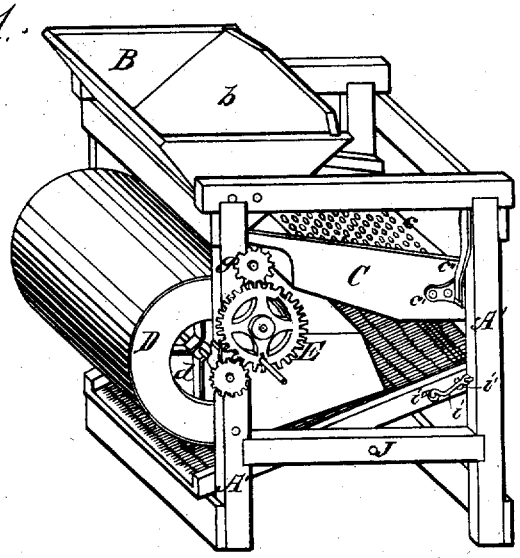
Figure 2:
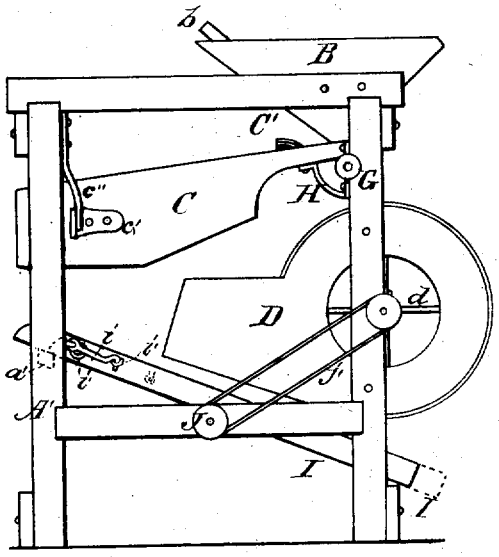
Figure 3:
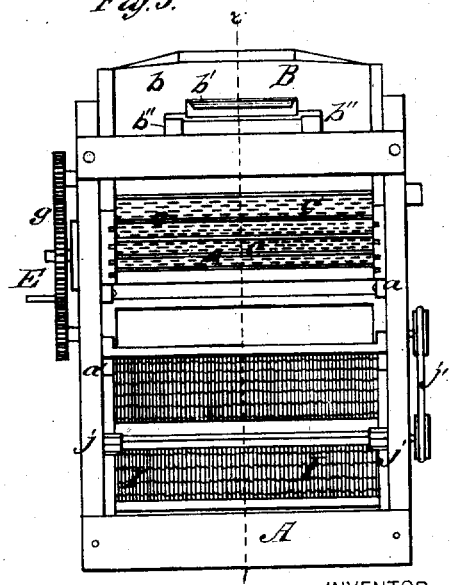
Figure 4:
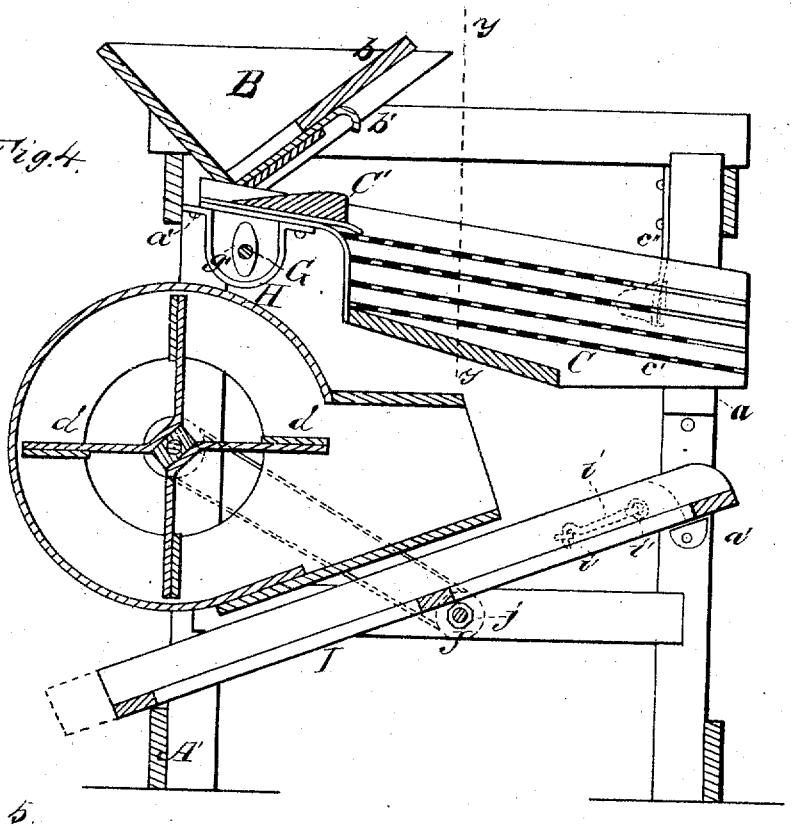
Figure 5:
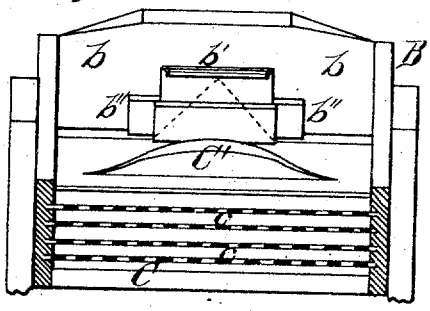
Figure 6:
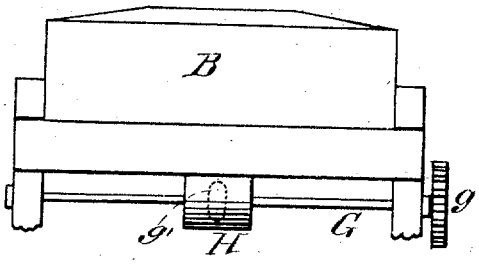
Figure 7:
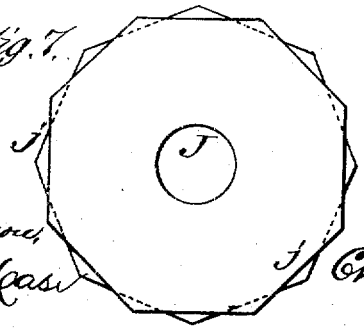

Figure 1 is a perspective view of a machine embodying the elements of the invention. Fig. 2 is an elevation of the side opposite that shown in Fig. 1. Fig. 3 is an elevation of the discharge end. Fig. 4 is a vertical central longitudinal section. Fig. 5 is a front elevation, partly in section, on the line *z z*, Fig. 4. Fig. 6 is an elevation of the cam, hopper, and adjacent parts. Fig. 7 is a detached view of the polygonal cams.

The invention relates to an improvement in machines for cleaning and separating grain; and consists in certain devices, hereinafter more specifically described.

In the accompanying drawings, A′ represents the framing-posts, which are properly connected by the braces A. B is the hopper, the front side of which, *b*, is made to slide in suitable ledges in the sides adjacent to its ends. *b′* is a slide, covering an inverted V-shaped opening in the central part and bottom of the slide *b*, and operates through any suitable guides, *b″*. C is a box or shoe, resting beneath and forward of the hopper B, and containing any desired number of removable perforated plates, *c*. Its end next the hopper is made imperforate, and it has on its upper face an elevation, C′, as shown in the drawings. The forward end of the box C rests on the transverse framing-bar *a*, and its rear end on the projecting studs *a′*. *c′* are lugs projecting from the sides and forward end of the box C, and *c″* are springs attached to the framing-posts A, and resting against the rear sides of the lugs *c′*, so that when the springs operate they shall have a forward action, moving the box C correspondingly, and bringing the lugs *c′* sharply against the framing-posts A, which thus serve as a fixed bumper, the concussion of the lugs with the posts agitating the screens in the box C, and giving the box a percussive blow or motion in the direction of the flow of grain. D is the fan-case; *d*, the fan, and E, the main drive-wheel. G is a transverse shaft having suitable bearings in the framing, and geared by a pinion, *g*, with the drive-wheel E. The shaft G is just below the rear of the box C, and is provided midway between its bearings with a two-ended or double eccentric cam, *g′*. H is a bow secured upon and projecting from the under side of the box C, and partly encircling the eccentric *g*. Thus as the cam is rotated its elongated parts come in contact with the inside of the rear of the bow H, and draw the box C backward, which box is instantly thrown forward by the action of the springs *c″*, when the elongated parts of the cam have passed the point of contact.

The box has, therefore, a rapid reciprocating movement with a percussive agitating action operating from rear to front, which utilizes the inertia of the grain, and at each blow drives the material on the plates in the box C further toward the discharge, thereby permitting the use of screens in a much more horizontal position than could be employed were the percussive action from front to rear—an action which tends to throw the material toward the hopper or keep it stationary upon the screen. In other words, the motion of the box C is backward, then forward, with a percussive action in the direction of the flow of the grain.

I is the discharge-screen of the ordinary wire kind, having long meshes lying in the direction of the flow of the grain over the screen. J is a transverse shaft, provided with the cams *j* placed near the opposite ends of the shaft, and polygonal in form, having in the present instance eight sides and as many angles, and are secured upon the shaft rigidly with their sides and angles alternating, as shown at Fig. 7.

The screen I is suspended loosely at one end above the studs *a′*, by the hooks *i*, the other end being free above the brace A′, the center of the sides of the screen resting upon the cams *j*, so that as the cams are rotated a rapid agitation is communicated to the screen by the successive contact of the angles of the cams with the sides of the screen, the shaft J being driven by a belt, *j′*, from the fan-shaft.

The screen I is inclined toward its discharging end, and may be adjusted in its position by means of the hooks *i* being made to engage with the eyes *i'* on its sides.

It is evident that a screen having any suitably-shaped mesh can be substituted for the long mesh-screen, according to the work to be done on the machine.

The operation of my invention is as follows: The feed from the hopper may be controlled, as desired, by the slides *b* and *b'*, the slide *b'* being used for ordinary grain as it comes from the thrashing-machine, and the slide *b* for increasing and spreading the grain when it contains very much extraneous substance, such as straw, chaff, and other material.

In feeding from the smaller central opening, covered by the slide *b'*, as shown by dotted lines at Fig. 5, the grain and extraneous material falling from the hopper upon the imperforate end of the box C will be divided and deflected to the right and left sufficiently by the distributer C' to cause it to fall in an even sheet on the rear end of the upper perforated plate *c*. The box of plates C receives motion from the cam *g'*, the elongated ends of which come in contact with one side of the loop H, the motion of the cam carrying the box back and permitting it to return through the action of the spring *c''* rapidly, but without such sudden motion as would cause the plates to pass from beneath the grain and refuse resting upon them. The forward motion of the box is suddenly arrested by the lugs *c'* striking against the posts A, thereby causing the grain to pass through the plates, and the refuse to move over them in the direction of the discharge by inertia. This last-described movement will greatly facilitate the passage of the grain through the plates *c*, and the larger refuse, such as sticks, straws, oats, barley, &c, over the ends thereof, where they are discharged for removal. The grain, falling from the plates *c* to the wire screen I, will be subjected to the fan-blast for further purification by the removal of the lighter particles still remaining therein, and it will be plainly seen that by regulating the position of said screen I, by means of the hooks *i* and eyes *i'*, it may be made to receive a considerable portion of said lighter material, or to reject it nearly entirely by means of its upper end being so low as to allow its passage over the same.

The great superiority of long-meshed wire screens for separating the longer and narrower grains from the thicker kinds, such as oats from barley, rye from wheat, oats from wheat, &c., is well understood; but their great liability to clog, by the wires springing apart and receiving and retaining grains, is so well appreciated as to almost preclude their use.

It is evident that the cam *g* may be made to act directly upon the box C, and also that the very rapid agitation of the screen I will prevent it clogging, and insure a free passage of the material through it or over its surface.

What I claim as my invention, and desire to secure by Letters Patent, is—

1. In combination with the long-meshed screen I, the shaft J, having polygonal cams *j* of eight or more faces, arranged alternately, as described, so as to impart a rapid and laterally-oscillating motion to the screen, for the purpose specified.

2. The box C, provided with the lugs *c'*, in combination with the springs *c''*, posts A, shaft G, and cam *g'*, substantially as set forth.

3. The screen I, in combination with the polygonal cams *j*, having their alternate faces and angles opposite, and operated by the shaft J, substantially as specified.

4. The combination, with the reciprocating screen-frame, provided with lugs, of the posts and springs secured thereto, substantially as set forth.

5. The combination, with the reciprocating screen-frame, provided with lugs, of the springs and the posts, said lugs serving at once as a point of impact of the screen-frame against the posts, and as a pressure-bearing for the springs, substantially as set forth.

6 A screen-frame actuated by a cam operating thereon, or on some device rigidly connected thereto, in combination with a fixed bumper, with which the lower end of the screen-frame comes in percussive contact at the termination of its movement in the direction of the descending grain, substantially as set forth.

In testimony that I claim the above I have hereunto subscribed my name in the presence of two witnesses.

EGBERT H. OSBORN.

Witnesses:
I. C. BERNARD,
CHARLES E. OSBORN.